(12) United States Patent
Loesch et al.

(10) Patent No.: US 10,947,354 B2
(45) Date of Patent: Mar. 16, 2021

(54) HIGH TEMPERATURE COMPOSITE HONEYCOMB

(71) Applicant: Hexcel Corporation, Dublin, CA (US)

(72) Inventors: Robert Charles Loesch, Mesa, AZ (US); Merid Minasse Haile, Casa Grande, AZ (US); Earl Frederick Ayle, Chandler, AZ (US); Clark Russell Smith, Phoenix, AZ (US)

(73) Assignee: HEXCEL CORPORATION, Dublin, CA (US)

( * ) Notice: Subject to any disclaimer, the term of this patent is extended or adjusted under 35 U.S.C. 154(b) by 13 days.

(21) Appl. No.: 16/518,528

(22) Filed: Jul. 22, 2019

(65) Prior Publication Data

US 2021/0024711 A1   Jan. 28, 2021

(51) Int. Cl.
*C08J 5/24* (2006.01)
*C08J 5/04* (2006.01)
*B32B 27/38* (2006.01)

(52) U.S. Cl.
CPC .............. *C08J 5/24* (2013.01); *C08J 5/042* (2013.01); *B32B 27/38* (2013.01); *B32B 2262/106* (2013.01); *B32B 2264/0264* (2013.01); *C08J 2363/00* (2013.01); *C08J 2363/02* (2013.01); *C08J 2363/04* (2013.01); *C08J 2463/04* (2013.01); *C08J 2477/00* (2013.01); *C08J 2477/02* (2013.01); *C08J 2479/08* (2013.01); *C08J 2481/06* (2013.01)

(58) Field of Classification Search
None
See application file for complete search history.

(56) References Cited

U.S. PATENT DOCUMENTS

| 3,533,894 A | 10/1970 | Engelbrecht et al. |
| 5,514,444 A | 5/1996 | Buyny et al. |
| 5,685,936 A | 11/1997 | Komine et al. |
| 5,711,992 A | 1/1998 | Heitkamp et al. |
| 6,245,407 B1 * | 6/2001 | Wang ................. B29D 99/0089 427/207.1 |
| 2013/0157001 A1 * | 6/2013 | Knoff ........................ B32B 5/08 428/118 |

(Continued)

FOREIGN PATENT DOCUMENTS

CA    2046947 C    9/2001

OTHER PUBLICATIONS

Hexcel Corporation; Product Data, HebWeb® Nonmetallic Flex-Core®, Honeycomb; Copyright® 2014; 4 pages; Jun. 2014.

(Continued)

*Primary Examiner* — David Sample
*Assistant Examiner* — Elizabeth Collister
(74) *Attorney, Agent, or Firm* — W. Mark Bielawski; David J. Oldenkamp (57) ABSTRACT

Composite honeycomb that may be contoured to form composite honeycomb structures, which have tight radii of curvatures and/or compound curvatures, and which are suitable for use in high temperature environments. The method for making the composite honeycomb involves using high temperature prepreg to make a flexible composite honeycomb that is formed into a composite honeycomb precursor. A high temperature coating resin is applied to the composite honeycomb precursor to form the high temperature composite honeycomb.

20 Claims, 2 Drawing Sheets

(56) References Cited

U.S. PATENT DOCUMENTS

2019/0024589 A1  1/2019  Bowen et al.

OTHER PUBLICATIONS

Hexcel Corporation; Product Data, HebWeb® HRH-327, Fiberglass Reinforced Polyimide Honeycomb; Copyright® 2014; 3 pages; Jun. 2014.
Slovay, Technical Data Sheet, Torlon® AI-10; Polyamide-imide; pp. 1-3; Revised Nov. 18, 2014, © 2019 Solvay Specialty Polymers.
(IST) Industrial Summit Technology Corporation, Safety Data Sheet; SKYBOND® 700 Polyimide Resin, Solution of aromatic polyimide precursor in ethanol and n-methyl pyrrolidone (NMP); pp. 1-15; updated Jun. 1, 2015.
(IST) Industrial Summit Technology Corporation, Safety Data Sheet; SKYBOND® 705 Polyimide Resin, pp. 1-13; updated Jun. 1, 2015.

\* cited by examiner

HIGH TEMPERATURE COMPOSITE HONEYCOMB

BACKGROUND OF THE INVENTION

1. Field of the Invention

The present invention relates generally to flexible honeycomb that may be contoured to form composite honeycomb structure that have tight radii of curvatures and/or compound curvatures and, which are suitable for use at high temperatures. More particularly, the present invention is directed to high temperature composite honeycomb where the method for making the composite honeycomb involves using high temperature prepreg to make a flexible composite honeycomb that is formed into a composite honeycomb precursor. A high temperature coating resin is then applied to the composite honeycomb precursor to form the high temperature composite honeycomb.

2. Description of Related Art

Composite honeycomb has been a popular material for use in aircraft and aerospace vehicles because it is relatively strong and lightweight. One method for making composite honeycomb involves using prepreg to form corrugated ribbons which have alternating channels and nodes that extend perpendicular to the ribbon direction. The corrugated ribbons may be partially or completely cured so that they retain their corrugated shape. Prepreg is a well-known material that is composed of a fibrous support which has been pre-impregnated with a curable resin. The corrugated prepreg ribbons are stacked, aligned, bonded together and cured, if necessary, to form a honeycomb precursor. Typically, multiple coats of a coating resin are applied to the honeycomb precursor in order to enhance various mechanical properties of the composite honeycomb.

The dimensional nomenclature typically used for honeycomb includes: a thickness direction or cell depth; a lengthwise or ribbon direction, which is transverse to the thickness direction; and a width direction that is perpendicular to the thickness and lengthwise directions. The plurality of alternating channels and nodes in the corrugated composite ribbons are arranged next to each other in the lengthwise or ribbon direction. The corrugated prepreg ribbons are stacked in the widthwise direction. The channels and nodes each extend in the thickness direction between the two edges of the honeycomb to define the cell depth.

Shear strength is an important property of a composite honeycomb. Shear strength is determined by attaching a fixture to each edge of the honeycomb and applying shearing forces to the honeycomb edges via the fixtures. A typical shear failure mode is for the honeycomb walls to buckle as the shearing forces reach the shear strength of the honeycomb. The shearing forces may be applied to the honeycomb edges in a number of different directions to determine the directional shear strength of the honeycomb. For example, shearing forces are applied in the lengthwise direction in order to determine the lengthwise shear (LSR) of the honeycomb. Shearing forces are applied in the widthwise direction in order to determine widthwise shear (WSR). The lengthwise shear of a composite honeycomb is typically higher than the widthwise shear. In many cases, the WSR of a flexible composite honeycomb is only 50 percent or less of the LSR. This asymmetric resistance to shear is an important consideration when designing any structure that includes flexible composite honeycomb.

In many structural designs, the composite honeycomb is oriented to take advantage of the higher shear strength in the lengthwise direction. However, there are many situations where it is desirable that the shear strength of the composite honeycomb be as symmetric as possible. However, any attempt to increase the WSR relative to the LSR must take into account the complicated relationship between the various elements that make up a composite honeycomb. These elements include the prepreg fibrous support, the prepreg resin matrix, the node adhesive that is used to bond the corrugated ribbons together and the coating resin. In addition, the density of the composite honeycomb, cell size, cell shape, the fibrous support weight, the amount of resin matrix and the amount of coating resin applied to the honeycomb all play major roles in determining shear properties of the honeycomb.

The relationship between LSR and WSR for composite honeycombs is complicated and unpredictable. Little is known about what elements and/or other properties of the composite honeycomb might be varied to increase WSR relative to LSR or if such a relative increase is even possible for a given type of composite honeycomb. Further complicating the situation is that any attempt to increase WSR relative to LSR should do so without deleteriously affecting other properties of the honeycomb, such as increasing honeycomb density or reducing the compressive strength of the honeycomb or reducing the formability of the honeycomb in the widthwise direction.

Composite honeycomb having hexagonal cells are widely used in the aerospace industry. Such hexagonal honeycomb tends to be stiff and can be difficult to form into curved structures without buckling the cell walls. In most cases, curved honeycomb structures are made by seaming together multiple sections of hexagonal acoustic honeycomb. Flexible honeycomb is available which can be formed into structures with tight radii of curvature and/or compound curves. Flex-Core® honeycomb is a type of flexible honeycomb that is available from Hexcel Corporation (Casa Grande, Ariz.). Flex-Core® honeycomb has a unique cell configuration in which the cell walls include convex and concave curvatures. The unique combination of convex and concave cell wall curvatures, as well as other cell design features of Flex-Core® honeycomb, impart flexibility and formability to the honeycomb so that structures with tight radii and/or compound curvatures can be formed with reduced anticlastic curvature and without buckling the cell walls.

For acoustic applications, such as jet engine nacelles, acoustic materials are added to the honeycomb structure so that the honeycomb cells are acoustically closed with a solid sound impermeable sheet or skin at the end located away from the engine and covered with a porous or perforated sound permeable covering at the end located closest to the engine. The closing of the honeycomb cells with acoustic material in this manner creates an acoustic resonator that provides attenuation, damping and/or suppression of the noise. Acoustic septums are also usually incorporated into the interior of the honeycomb cells in order to provide the resonator with additional noise attenuation properties.

The inherent flexibility of Flex-Core® honeycomb makes it a desirable honeycomb for use in making acoustic structures, such as jet engine nacelles, where tight radii of curvature and/or compound curvatures are required. However, the unique cell configuration of Flex-Core® honeycomb presents complex challenges with respect to the insertion of a septum cap style acoustic septum into the cell. Published patent application Publication No. US 2019/

0024589 A1, describes acoustic panels in which septum cap style acoustic septa are inserted into honeycomb having the Flex-Core® honeycomb cell configuration and similar cell configurations.

Large jet engines include a combustion or hot section that is located centrally within the engine. The hot section produces large amounts of hot combustion gases. The hot section is surrounded by an annular passageway through which air flows at much colder temperatures. Hot sections typically operate at temperatures on the order of 500° F. to 750° F.

Composite honeycomb structures, such as acoustic honeycomb, which are located near the hot sections must be able to withstand the high operating temperatures or they must be protected by an insulating structure, such as a thermal blanket. Although thermal blankets provide adequate thermal insulation, they also take up valuable space and add weight. In addition, the service life of a typical thermal blanket is limited so that it must be replaced at specified time intervals. The thermal blank must also be removed to allow routine inspection of underlying structures. This removal and reinstallation process is time consuming and many times results in the thermal blanket being damaged. Repairing and/or replacing a damaged thermal blanket can involve significant added time and cost.

In order to reduce or eliminate the use of thermal blankets and other insulating systems, it is desirable that the honeycomb have as high an operating temperature as possible. Honeycomb made from metallic or ceramic material can operate at temperatures higher than non-metallic or non-ceramic composite honeycomb. However, there are many situations where a non-metallic or non-ceramic composite honeycomb is desired. Such composite honeycomb is available that is capable of extended service at temperatures of 350° F. to 500° F. with short-term capabilities up to 700° F. The honeycomb has hexagonal cells and utilizes a glass fabric fibrous support in combination with a polyimide resin system for the prepreg resin matrix, node adhesive and coating resin. This type of fiberglass reinforced hexagonal polyimide honeycomb is available from Hexcel Corporation (Casa Grande, Ariz.) under the tradename HexWeb® HRH-327.

Although HexWeb® HRH-327 is suitable as a high temperature composite honeycomb for use at operating temperatures of 350° F. to 500° F. with short-term capabilities up to 700° F., the hexagonal cells and large amount of dip resin make it too stiff for contouring into structures where tight radii of curvature and/or compound curvatures are required.

Flex-Core® honeycomb, which does have the requisite flexibility for contouring into tight radii of curvature and/or compound curvatures, is not presently available in a form that is suitable for use at high operating temperatures (350° F. to 500° F.). Flex-Core® HRP-F35 honeycomb is the highest temperature Flex-Core® honeycomb that is presently available from Hexcel Corporation (Casa Grande, Ariz.). Flex-Core® HRP-F35 utilizes a glass fabric fibrous support in combination with a phenolic resin system for the prepreg resin matrix, node adhesive and coating resin. The maximum useful service temperature of Flex-Core® HRP-F35 honeycomb is 350° F. Accordingly, this type of flexible honeycomb has been used mainly in relatively low temperature environments.

It would be desirable to provide a flexible honeycomb, like Flex-Core® honeycomb, that is suitable for operation in high temperature environments (350° F. to 500° F.). It would also be desirable that such high temperature flexible honeycomb have a high widthwise shear strength relative to the lengthwise shear strength of the honeycomb.

SUMMARY OF THE INVENTION

In accordance with the present invention, it was discovered that high temperature resin systems may be used to make honeycomb having cell configurations that are the same or similar to Flex-Core® honeycomb and that the resulting composite honeycomb is suitable for operations in high temperature environments. In addition, it was discovered that the relative difference between the lengthwise shear strength (LSR) and widthwise shear strength (WSR) of the high temperature honeycomb can be minimized without affecting the overall density or compression strength of the honeycomb. It was discovered that reducing the amount of coating resin and increasing the areal weight of the fibrous support, so as to maintain the same overall honeycomb density, resulted in a reduced difference between LSR and WSR.

In accordance with the present invention, a composite honeycomb is provided that is suitable for use in high temperature environments. The composite honeycomb has a lengthwise direction, a widthwise direction and a thickness direction. The composite honeycomb is composed of a plurality of upper corrugated ribbons that each include a first plurality of alternating upper channels and upper nodes wherein each of the upper channels and each of the upper nodes extends in the thickness direction. Each of the upper corrugated ribbons is made up of a first fibrous support and a first high temperature resin. The composite honeycomb further includes a plurality of lower corrugated ribbons that each include a second plurality of alternating lower channels and lower nodes wherein each of the lower channels and each of the lower nodes extends in the thickness direction. Each of the lower corrugated ribbons is made up of a second fibrous support and a second high temperature resin.

The upper corrugated ribbons and lower corrugated ribbons are stacked in the widthwise direction to form a honeycomb structure composed of alternating layers of upper corrugated ribbons and lower corrugated ribbons. The channels of the upper corrugated ribbons are bonded to the nodes of the lower corrugated ribbons with a high temperature node adhesive and the channels of the lower corrugated ribbons are bonded to the nodes of the upper corrugated ribbons with a high temperature node adhesive such that a plurality of honeycomb cells are formed wherein each of said honeycomb cells extends in the thickness direction.

The honeycomb cells each have a left side and a right side. Each honeycomb cell is defined by honeycomb cell walls that extend in the thickness direction between the edges of the honeycomb. The honeycomb cell walls of each cell include a lower wall that extends between the left side and the right side of the honeycomb cell and an upper wall that also extends between the left side and the right side of the honeycomb cell. The lower wall includes a lower concave left end portion, a lower concave right end portion and a lower central portion located between the lower concave left end portion and the lower concave right end portion. The upper wall includes an upper convex left end portion, an upper convex right end portion and an upper central portion located between the upper convex left end portion and the upper convex right end portion. The lower concave left end portion and the upper convex left end portion are connected to form a left junction along the left side of the cell and the lower concave right end portion and the upper convex right end portion are connected to form a right junction along the right side of the cell.

The honeycomb, which has a density of from 3 to 6 pounds per cubic foot (48-96 kilograms per cubic meter), includes a high temperature coating resin that is present in an amount that is equal to from 10 to 25 weight percent of the total weight of the composite honeycomb. It was discovered that such a low amount of high temperature coating resin could be used with the above honeycomb cell configuration to provide a high temperature flexible honeycomb where the width shear strength is at least 60 percent of the length shear strength and typically at least 65 to 70 percent.

The present invention is also directed to acoustic honeycomb in which acoustic septa are inserted into the cells of the composite honeycomb and the methods used to make the composite honeycomb and acoustic panels.

The present invention is particularly advantageous with respect to flexible composite honeycomb because it combines the benefits of increased symmetric directional shear strength with the capability of operating in high temperature environments. These benefits are achieved without affecting the overall density or compression strength of the flexible composite honeycomb.

The above described and many other features and attendant advantages of the present invention will become better understood by reference to the following detailed description when taken in conjunction with the accompanying drawings.

DETAILED DESCRIPTION OF THE INVENTION

Composite honeycomb in accordance with the present invention finds use in any situation where a combination of honeycomb formability, high temperature capabilities and relatively symmetric directional shear strength is desired. Exemplary applications include sandwich panels for use in high speed aircraft, high energy radomes and structural and acoustical jet engine inlets, liners and nacelles. The composite honeycomb is particularly well-suited for use in acoustic structures which are located in and around large jet engines.

Figure 1:
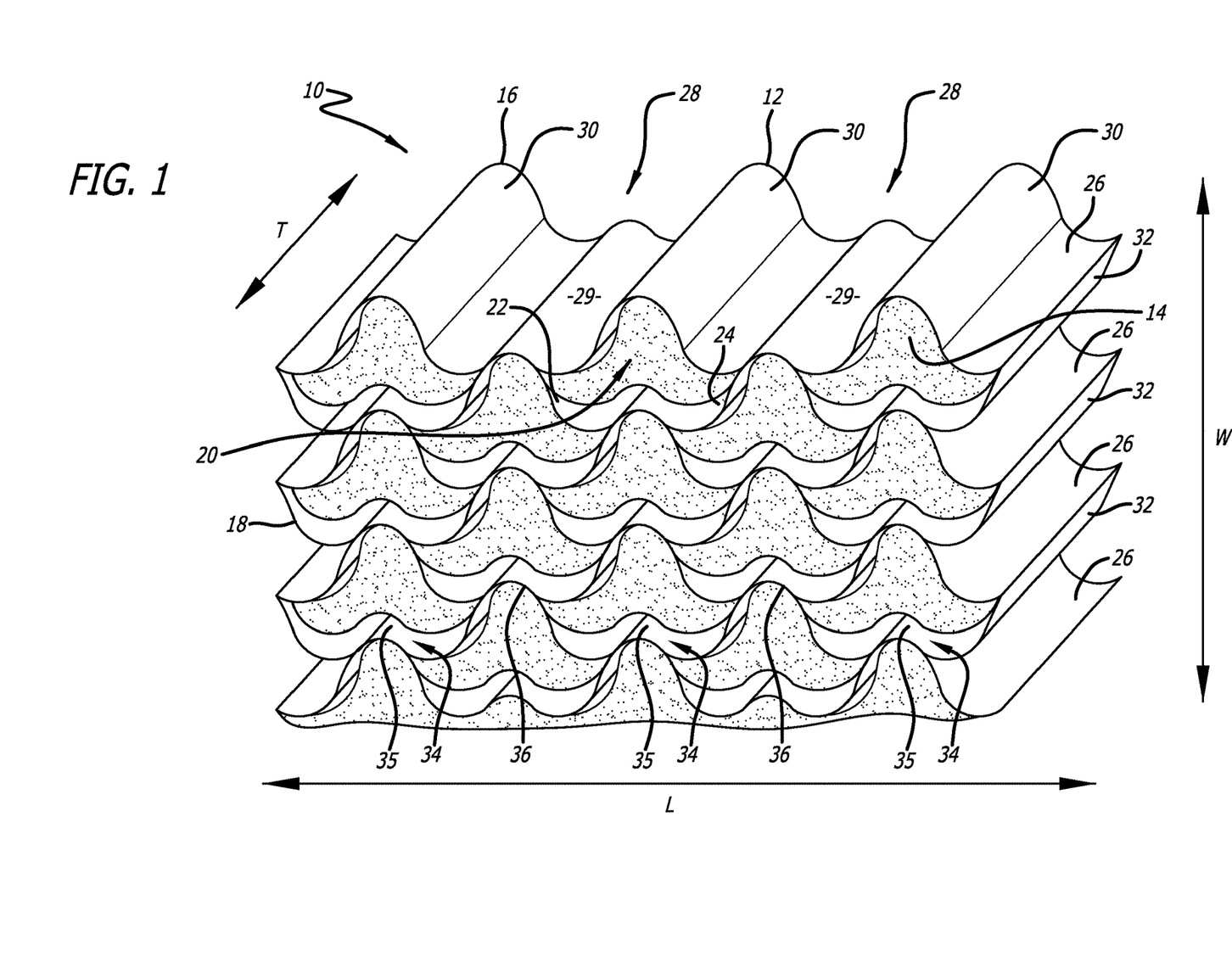
FIG. 1 is a perspective view of an exemplary high temperature honeycomb in accordance with the present invention which includes acoustic septa.

An exemplary high temperature honeycomb for use in an acoustic structure is shown generally at 10 in FIG. 1. The high temperature acoustic honeycomb 10 has a lengthwise direction (L), a widthwise direction (W) and a thickness direction (T). The high temperature acoustic honeycomb 10 includes a high temperature composite honeycomb 12 in accordance with the present invention and acoustic septa 14. Septa 14 are added to the honeycomb 10 when the honeycomb is being used as part of an acoustic damping structure. The septa 14 are formed by inserting numerous planar acoustic septum inserts into the honeycomb cells 20 to form acoustic septum caps which are initially friction-locked in place and then adhesively bonded to the cell walls to form the septa 14. Details of the insertion of septa into honeycomb having the same cell configuration as honeycomb 12 are set forth in published patent application Publication No. US 2019/0024589 A1. The contents of this published U.S. patent application are hereby incorporated by reference.

Preferred embodiments of the invention include those where the honeycomb 12 is part of an acoustic honeycomb 10 that includes septa 14. However, the invention is also directed to and covers non-acoustic composite honeycomb that do not include septa 14. The composite honeycomb 12 has a first edge 16 and a second edge 18. The composite honeycomb 12 forms a plurality of cells 20 that each have a left side 22 and a right side 24. The cells 20 extend between the first edge 16 and second edge 18 of the honeycomb 12.

The honeycomb 12 is composed of upper corrugated ribbons 26. The upper corrugated ribbons 26 each have alternating upper channels 28 and upper nodes 30 that are located next to each other in the lengthwise direction. Each of the upper channels 28 and nodes 30 that extend in the thickness direction. The upper channels 28 each includes a centrally raised portion 29. The upper corrugated ribbons 26 are each composed of a first fibrous support and a first high temperature resin matrix.

The honeycomb 12 is further composed of lower corrugated ribbons 32. The lower corrugated ribbons 32 each have alternating lower channels 34 and lower nodes 36 that are also located next to each other in the lengthwise direction. Each of the lower channels 34 and nodes 36 extend in the thickness direction. The lower channels 34 each includes a centrally raised portion 35. The lower corrugated ribbons 32 are each composed of a second fibrous support and a second high temperature resin matrix.

The upper corrugated ribbons 26 and lower corrugated ribbons 32 form the honeycomb 12 which is composed of alternating layers of upper corrugated ribbons 26 and lower corrugated ribbons 32. The layers are aligned and stacked in the widthwise direction such that the raised central portions 29 of the upper channels 28 are bonded with a high temperature node adhesive to the lower nodes 36 of the lower corrugated ribbons 32 and the raised central portions 35 of the lower channels 34 are bonded with a high temperature node adhesive to the upper nodes 30 of the upper corrugated ribbons 26 with a high temperature node adhesive.

Figure 2:
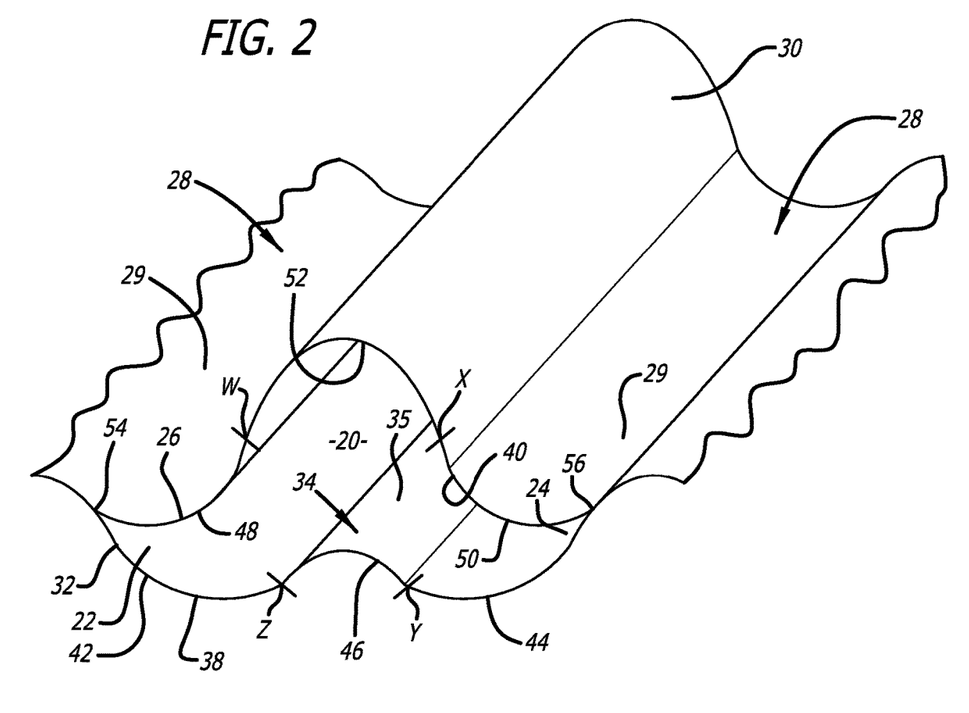
FIG. 2 is a cross-sectional diagrammatic view of a single cell from the flexible honeycomb shown in FIG. 1.

Each of the honeycomb cells 20 is defined by honeycomb cell walls that extend in the thickness direction between the edges of the honeycomb. As shown in FIG. 2, the honeycomb cell walls include a lower wall 38 that extends in the lengthwise direction between the left side 22 and the right side 24 of the honeycomb cell 20 and an upper wall 40, which also extends in the lengthwise direction between the left side 22 and right side 24 of the honeycomb cell 20.

The lower wall 38 and upper wall 40 include convex and concave portions. The approximate location of the transitions between the various portions in the upper and lower cell walls are indicated by hash marks "w", "x", "y" and "z" in FIG. 2. The lower wall 38 includes a lower concave left end portion 42, a lower concave right end portion 44 and a lower central convex portion 46 located between the lower concave left end portion 42 and lower concave right end portion 44. The upper wall 40 includes an upper convex left end portion 48, an upper convex right end portion 50 and an upper central concave portion 52 located between the upper convex left end portion 48 and the upper convex right end portion 50. The lower concave left end portion 42 and the upper convex left end portion 48 are connected to form a left junction 54 along the left side of said cell and the lower concave right end portion 44 and the upper convex right end portion 50 are connected to form a right junction 56.

Composite honeycomb in accordance with the present invention is preferably made using the so-called "corrugation method" of honeycomb fabrication. The corrugation method involves forming prepreg into layers of corrugated composite ribbons. The corrugated composite ribbons are partially cured, if necessary, to ensure that the corrugated composite ribbons retain their shape. The corrugated ribbons are stacked so that the nodes and channels of the various layers are aligned and bonded together with a node adhesive to form a honeycomb precursor. A coating or dip resin is applied to the honeycomb precursor to form a coated honeycomb precursor which is sufficiently flexible that it can be contoured to form structures with tight radii and/or compound curvatures. Once the desired honeycomb shape is achieved, the coated honeycomb precursor is cured to produce the final composite honeycomb.

Figure 3:
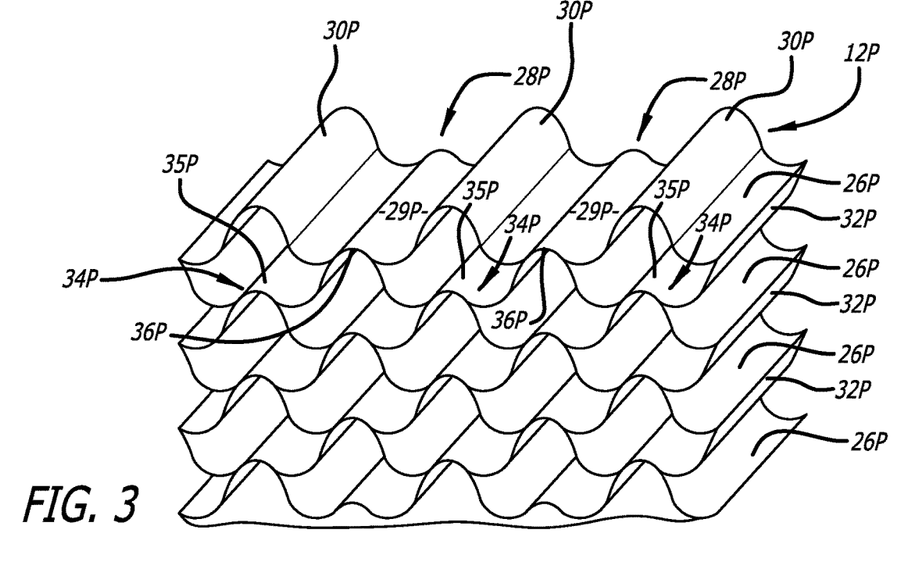
FIG. 3 is a perspective view of an exemplary honeycomb precursor prior to the high temperature coating resin being applied and cured to form the high temperature flexible honeycomb.

An exemplary composite honeycomb precursor 12P is shown in FIG. 3. The composite honeycomb 12 shown in FIG. 1 is made by applying a coating resin to the composite honeycomb precursor 12P and curing the resulting coated precursor to form composite honeycomb 12. The identification numbers in FIG. 3 and FIG. 1 are the same, except that the numbers in FIG. 3 include "P" in order to indicate that the composite honeycomb shown in FIG. 3 is the precursor 12P of the composite honeycomb 12 shown in FIG. 1.

Prior to application of the coating resin, the precursor 12P has a non-coated honeycomb density. The difference ($\Delta D$) between the non-coated honeycomb density and the density of the composite honeycomb 12 is determined by and equal to the amount of coating resin. The coating resin is typically applied by dipping the non-coated precursor 12P into a dip tank containing a solution of the desired coating resin. The coated precursor is removed from the dip tank and then cured. This dipping procedure is repeated until the desired amount of coating resin is applied.

The curing process, which is required for each dipping cycle, is time consuming and costly. Accordingly, it is preferred that the number of dip cycles be limited to from 1 to 4 dip cycles with 2 dip cycles being particularly preferred. It is preferred that $\Delta D$ be in the range of 0.3 to 1.5 pounds per cubic foot (4.8 to 24 kilograms per cubic meter) for composite honeycomb having a density of from 3 to 6 pounds per cubic foot (48 to 96 kilograms per cubic meter). For composite honeycomb having a density of from 4 to 5 pounds per cubic foot (64 to 80 kilograms per cubic meter), the preferred $\Delta D$ is from 0.4 to 1.2 pounds per cubic foot (6.4 to 19 kilograms per cubic meter). With respect to the overall weight of the honeycomb, the coating resin should be present in an amount that is equal to from 10 to 25 weight percent of the total weight of the honeycomb. Preferably the amount of coating resin will be equal to from 18 to 22 weight percent of the total weight of the honeycomb.

The prepreg that is used to make the upper and lower corrugated ribbons includes a fibrous support and an uncured high temperature resin. It is preferred that the first fibrous support of the upper corrugated ribbons be the same as the second fibrous support of the lower corrugated ribbon. The fibrous support must be able to withstand high temperatures (350° F. to 700° F.). Suitable fibrous support include carbon fibers, glass fibers and ceramic fibers. Glass fibers are preferred. The fibrous support may be in the form of woven or non-woven fabric. Woven glass fabric is preferred. For honeycomb having densities of from 4 to 5 pounds per cubic foot (64 to 80 kilograms per cubic meter), the preferred glass fabric with have an areal weight of from 140 to 160 grams per square meter (gsm) and more preferably an areal weight of from 145 to 155 gsm.

The uncured high temperature resin that is used in the upper and lower corrugated ribbons is preferably the same. The high temperature resin must be able to withstand service temperatures of 350° F. to 500° F., and preferably 350° F. to 700° F. Suitable high temperature resins include benzoxazines, bismaleimides, cyanate ester resins, high temperature epoxy resins, polyimides and polyamideimides. Exemplary polyimides are available from Industrial Summit Technology Corporation (Parlin, N.J.) under the tradenames SKYBOND® 700 and 705. Other exemplary polyimides are Unitech RP46 and RP50, which are available from Unitech Corporation (Arlington, Va.). An exemplary polyamideimide is available from Solvay Specialty Polymers (Alpharetta, Ga.) under the trade name Torlon® A-10. Exemplary benzoxazines include XU35910 benzoxazine, which is available from Huntsman (The Woodlands, Tex.). Exemplary bismaleimides include MATRIMID bismaleimide which is also available from Huntsman (The Woodlands, Tex.). Exemplary cyanate ester resins include PRIMASET cyanate ester resin, which is available from Lonza (Alpharetta, Ga.). Exemplary high temperature epoxy resins include DUR-ALCO 4703, which is available from Cotronics Corporation (Brooklyn, N.Y.).

The amount of high temperature resin in the prepreg used to form the corrugated ribbons should be such that the amount of high temperature resin matrix in the corrugated ribbons of the composite honeycomb is between 15 and 20 weight percent of the corrugated ribbon weight. Typically, the weight amount (resin content) of uncured high temperature resin in the prepreg will be approximately the same as the weight amount (resin matrix content) of high temperature resin matrix in the honeycomb corrugated ribbons. The preferred resin content of the prepreg is from 15 to 30 weight percent. A prepreg resin content of 20 to 25 is particularly preferred.

The node adhesive that is used to bond the composite corrugated ribbon channels to the corrugated ribbon nodes must be a high temperature node adhesive that can withstand service temperatures of 350° F. to 500° F., and preferably 350° F. to 700° F. The above-listed exemplary high temperature resins that are used as the prepreg resin may also be used as the high temperature node adhesive. If desired, the same high temperature resin that is used as the prepreg resin may also be used as the node adhesive.

The coating resin must also be a high temperature coating resin that can withstand service temperatures of 350° F. to 500° F., and preferably 350° F. to 700° F. The exemplary high temperature resins that are used as the prepreg resin may also be used as the high temperature coating resin. If desired, the same high temperature resin that is used as the prepreg resin may also be used as the node adhesive and the coating resin. Exemplary combinations where the prepreg resin, node adhesive and coating resin are not the same include: polyimide prepreg resin/polyimide node adhesive/polyamideimide coating resin; and polyamideimide prepreg resin/polyimide node adhesive/polyimide coating resin.

For honeycomb having densities of from 3 to 6 pounds per cubic foot (48 to 96 kilograms per cubic meter), the cross-sectional area of the cells will typically range from 0.5 square inch to 0.2 square inch. For acoustic applications, the depth of the cells (honeycomb or core thickness T) will generally range from 0.25 to 3 inches. The wall thicknesses of the corrugated ribbon will typically range from 0.005 to 0.01 inch. For jet engine nacelles, the composite honeycomb cells will typically have a cross-sectional area of about 0.1 to 0.5 square inch, wall thicknesses of around 0.025 to 0.05 inch and a depth of about 1.0 and 2.0 inches. Preferred high temperature composite honeycomb have a density of 4 to 5 pounds per cubic foot (64 to 80 kilograms per cubic meter) with cell sizes of 0.08 to 0.12 square inch, which corresponds to 30 to 40 cells per lineal foot in the widthwise direction.

When acoustic inserts 14 are included with the honeycomb 12, the acoustic inserts can be any of the standard acoustic materials may be used to form the septum caps. These acoustic materials are typically provided as relatively thin sheets that are perforated, porous or an open mesh fabric that is designed to provide noise attenuation. Perforations are formed in the solid sheet material either before or after the septa are placed within the composite honeycomb cells. Although any suitable metal, ceramic or plastic acoustic material may be used provided it can withstand service temperatures of 350° F. to 500° F., and preferably 350° F. to 700° F. It is preferred that the acoustic material be polyether ether ketone (PEEK) or a similar chemically resistant polymer material that is suitable for high temperature applications. Sheets or films of PEEK are available commercially from a number of sources, such as Victrex USA (Greenville, S.C.) which produces sheets of PEEK under the tradename VICTREX® PEEK™ polymer. KAPTON® polyimide film may be used as an alternative to PEEK film. KAPTON® polyimide film is available from DuPont Chemical Company (Midland, Mich.).

When using solid films as the septum material, holes are drilled through the film within the overall boundary of the planar portion of the cap. The holes may be drilled using a laser or other suitable hole drilling system. Open mesh monofilament fabric made from PEEK is preferred for high temperature applications. Sheets of open mesh monofilament acoustic fabric may be obtained from SEFAR America Inc. (Buffalo, N.Y.) under the trade names SEFAR PETEX, SEFAR NITEX and SEFAR PEEKTEX.

Examples of practice are as follow:

Composite honeycombs were prepared in which the fibrous support for the prepreg was a woven glass fiber fabric having an areal weight of 150 gsm. The high temperature resin for the prepreg was Torlon® A-10 polyamideimide (PAI) which has a maximum service temperature of about 500° F. The resin content (RC) of the prepreg was 23 weight percent, based on the total weight of the prepreg. The prepreg was used to make corrugated ribbons that were used as both the upper and lower corrugated ribbons in forming a honeycomb precursor. A sheet of prepreg (29 inches by 20 inches) was formed into a corrugated ribbon configuration that matched the corrugation configuration as shown in FIGS. 1 and 3, which is the same configuration that is used in Flex-Core® HRP honeycomb. The corrugated prepreg was partially cured at 520° F. for 120 minutes to set the corrugated shape.

Torlon® A-10 polyamideimide (PAI) was applied to the appropriate nodes of the partially cured corrugated prepreg. The PAI node adhesive was applied at a rate of about 0.3 pounds per cubic foot along the nodes. The partially cured corrugated prepreg was stacked, aligned and cured at 400° F. for 30 minutes to form the honeycomb precursor. The honeycomb precursor had a density of 3.55 pounds per cubic foot (pcf) (56.9 kilograms per cubic meter (Kg/m$^3$)). High temperature coating resin was applied to the honeycomb precursor by immersing the honeycomb precursor in a solution containing PAI dissolved in N-methyl pyrrolidone (NMP). The honeycomb precursor was removed from the solution and dried/cured at 400° F. for 90 minutes.

A first exemplary honeycomb (first example) having a density of 4.0 pcf (64 Kg/m$^3$) was formed by conducting the dipping/drying procedure twice. A second exemplary honeycomb (second example) having a density of 4.7 pcf (75 Kg/m$^3$) was formed by conducting the dipping/drying procedure twice with a heavier coating being applied during the coating steps. The density of the coating resin in the first honeycomb was 0.45 pcf (7.2 Kg/m$^3$) which amounts to 11 weight percent of the total composite honeycomb weight (11% coating resin content). The density of the coating resin in the second honeycomb was 1.15 pcf (18.4 Kg/m$^3$) which amounts to 24 weight percent of the total composite honeycomb weight (24% coating resin content). The ratio between the areal weight (gsm) of the fibrous support and the coating resin content (CRC for the first exemplary honeycomb was 13.6:1. The ratio between the areal weight (gsm) of the fibrous support and the CRC for the second exemplary honeycomb was (6.2:1).

The lengthwise shear strength (LSR), widthwise shear strength (WSR) and stabilized compressive strength (SCR) for the two exemplary composite honeycombs were determined at room temperature using standard shear evaluation procedures (ASTM C273) and stabilized compression tests (ASTM C365). For the first exemplary honeycomb, the SCR was about 480 pounds per square inch (psi), the LSR was about 210 psi and the WSR was about 140 psi. The WSR was about 67 percent of the LSR. For the second exemplary honeycomb, the SCR was about 750 psi, the LSR was about 260 psi and the WSR was about 170 psi. The WSR was about 65 percent of the LSR.

For comparison, a Flex-Core® HRP-F35-4.5 composite honeycomb was also tested for SCR, LSR and WSR. Flex-Core® HRP-F35-4.5 honeycomb has 35 cells per linear foot in the lengthwise direction and a density of 4.5 pcf (72 Kg/m$^3$). The prepreg that is used to make the HRP-F35-4.5 honeycomb is composed of woven glass fabric having an areal weight of 107 gsm and a phenolic resin having an upper temperature limit of 350° F. The same phenolic resin was used as the coating resin with polyamideimide being used as the node adhesive. The coating resin content (CRC) of the HRP-F35-4.5 honeycomb averages about 28 weight percent (28% coating resin content). The ratio between the areal weight (gsm) of the fibrous support and the CRC of the Flex-Core® HRP-F35-4.5 composite honeycomb was 3.8:1.

The SCR for the Flex-Core® HRP-F35-4.5 composite honeycomb was about 600 psi, the LSR was about 300 psi and the WSR was about 145 psi. The WSR was about 48 percent of the LSR.

The LSR of HRP-F35-4.5 honeycomb was higher than the LSR of the two exemplary high temperature composite honeycombs, as was expected due to the higher coating resin content (CRC) of HRP-F35-4.5 honeycomb. However, it was unexpected that the WSR of the two exemplary composite honeycombs were higher than the WSR of HRP-F35-4.5 honeycomb. As a result, the two exemplary honeycombs were substantially more symmetric in directional shear strength (WSR=65 or 67% of LSR) than the HRP-F35-4.5 honeycomb (WSR=48% of LSR).

In order to achieve symmetric directional shear strength in accordance with the present invention, the ratio between the fibrous support weight (gsm) and the weight percent of coating resin (FAW:CRC) should range from 15:1 to 5:1. As can be seen from the above examples the first example provides relatively high symmetrical shear strength (WSR=67% of LSR) with a FAW:CRC of 13.6:1. The second example also provides relatively high symmetrical shear strength (WSR=65% of LSR) with a FAW:CRC of 6.2:1. Due to the relatively smaller CRC, the SCR of the first example was substantially lower (480 psi) than the second example (CSR=750 psi). Accordingly, if a relatively high CSR is desired, it is preferred that the FAW:CRC of the high temperature composite honeycomb be at the lower end of the range and preferably from 10:1 to 6:1.

It is preferred that the areal weight of the fibrous support and CRC be such that the FAW:CRC of the high temperature composite honeycomb provides a combination of high symmetrical shear strength and high SCR. An exemplary FAW:CRC range for obtaining combined high symmetrical shear strengths and high CSR's is from 8:1 to 7:1. For situations where composite ribbons are composed of fibrous supports having different areal weights, the FAW of the honeycomb is the weighted average of the areal weights of the different fibrous supports.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments but is only limited by the following claims.

What is claimed is:

1. A composite honeycomb that is suitable for use in high temperature environments, said composite honeycomb having a lengthwise direction, a widthwise direction and a thickness direction wherein said composite honeycomb has a length shear strength measured in said lengthwise direction and a width shear strength measured in said widthwise direction, said composite honeycomb comprising:

a plurality of upper corrugated ribbons comprising a first plurality of alternating upper channels and upper nodes, said first plurality extending in said lengthwise direction wherein each of said upper channels and each of said upper nodes extends in said thickness direction and wherein each of said upper corrugated ribbons comprises a first fibrous support having a first fibrous support weight expressed in grams per square centimeter and a first high temperature resin matrix;

a plurality of lower corrugated ribbons comprising a second plurality of alternating lower channels and lower nodes, said second plurality extending in said lengthwise direction, wherein each of said lower channels and each of said lower nodes extends in said thickness direction and wherein each of said lower corrugated ribbons comprises a second fibrous support having a second fibrous support weight expressed in grams per square centimeter and a second high temperature resin matrix, said upper corrugated ribbons and lower corrugated ribbons forming a honeycomb structure comprising alternating layers of upper corrugated ribbons and lower corrugated ribbons that are stacked in said widthwise direction, wherein the channels of said upper corrugated ribbons are bonded to the nodes of said lower corrugated ribbons with a high temperature node adhesive and wherein the channels of said lower corrugated ribbons are bonded to the nodes of said upper corrugated ribbons with a high temperature node adhesive such that a plurality of honeycomb cells are formed wherein each of said honeycomb cells extends in said thickness direction, said honeycomb cells each having a left side and a right side, wherein each of said honeycomb cells is defined by honeycomb cell walls, said honeycomb cell walls comprising a lower wall that extends between said left side and said right side of the honeycomb cell and an upper wall that also extends between said left side and said right side of the honeycomb cell, said lower wall comprising a lower concave left end portion, a lower concave right end portion and a lower central convex portion located between said lower concave left end portion and said lower concave right end portion, said upper wall comprising an upper convex left end portion, an upper convex right end portion and an upper central concave portion located between said upper convex left and said upper convex right end portion, wherein said lower concave left end portion and said upper convex left end portion are connected to form a left junction along the left side of said cell and said lower concave right end portion and said upper convex right end portion are connected to form a right junction along the right side of said cell, said honeycomb structure having a non-coated honeycomb density; and a high temperature coating resin covering said honeycomb walls, said high temperature coating resin being present in a resin coating amount that is equal to from 10 to 25 weight percent of the total weight of said composite honeycomb, said composite honeycomb having a density of from 3 to 6 pounds per cubic foot (48 to 96 kilograms per cubic meter) wherein the ratios between the first and second fibrous support weights and said resin coating amount is from 15:1 to 5:1 and wherein the width shear strength is at least 60 percent of said length shear strength.

2. The composite honeycomb according to claim 1 wherein said high temperature coating resin is present in an amount that is equal to from 18 to 22 weight percent of the total weight of said composite honeycomb.

3. The composite honeycomb according to claim 2 wherein said composite honeycomb has a density of from 4 to 5 pounds per cubic foot (64 to 80 kilograms per cubic meter).

4. The composite honeycomb according to claim 3 wherein the width shear strength is at least 65 percent of said length shear strength.

5. The composite honeycomb according to claim 1 wherein said first fibrous support and said second fibrous support each comprises glass fabric wherein said first and second fibrous support weights are from 140 to 160 grams per square meter.

6. The composite honeycomb according to claim 4 wherein said first fibrous support and said second fibrous support each comprises glass fabric wherein said first and second fibrous support weights are from 145 to 155 grams per square meter.

7. The composite honeycomb according claim 1 wherein said high temperature node adhesive, said high temperature first resin matrix, said high temperature second resin matrix and said high temperature coating resin are selected from the group consisting of benzoxazines, bismaleimides, cyanate ester resins, high temperature epoxy resins, polyimides and polyamideimides.

8. The composite honeycomb according to claim 4 wherein said high temperature node adhesive, said high temperature first resin matrix, said high temperature second resin matrix and said high temperature coating resin are selected from the group consisting of benzoxazines, bismaleimides, cyanate ester resins, high temperature epoxy resins, polyimides and polyamideimides.

9. The composite honeycomb according to claim 1 wherein acoustic septum are located within one or more of said honeycomb cells.

10. A method for making a composite honeycomb that is suitable for use in high temperature environments, said composite honeycomb having a lengthwise direction, a widthwise direction and a thickness direction wherein said composite honeycomb has a length shear strength measured in said lengthwise direction and a width shear strength measured in said widthwise direction, said method comprising the steps of:

A) providing a honeycomb precursor that comprises:
  a) a plurality of upper corrugated ribbons comprising a first plurality of alternating upper channels and upper nodes, said first plurality extending in said lengthwise direction wherein each of said upper channels and each of said upper nodes extends in said thickness direction and wherein each of said upper corrugated ribbons comprises a first fibrous support having a first fibrous support weight expressed in grams per square centimeter and a first high temperature resin matrix;
  b) a plurality of lower corrugated ribbons comprising a second plurality of alternating lower channels and lower nodes, said second plurality extending in said lengthwise direction, wherein each of said lower channels and each of said lower nodes extends in said thickness direction and wherein each of said lower corrugated ribbons comprises a second fibrous support having a second fibrous support weight expressed in grams per square centimeter and a second high temperature resin matrix, said upper corrugated ribbons and lower corrugated ribbons forming a honeycomb structure comprising alternating layers of upper corrugated ribbons and lower corrugated ribbons that are stacked in said widthwise direction, wherein the channels of said upper corrugated ribbons are bonded to the nodes of said lower corrugated ribbons with a high temperature node adhesive and wherein the channels of said lower corrugated ribbons are bonded to the nodes of said upper corrugated ribbons with a high temperature node adhesive such that a plurality of honeycomb cells are formed wherein each of said honeycomb cells extends in said thickness direction, said honeycomb cells each having a left side and a right side, wherein each of said honeycomb cells is defined by honeycomb cell walls, said honeycomb cell walls comprising a lower wall that extends between said left side and said right side of the honeycomb cell and an upper wall that also extends between said left side and said right side of the honeycomb cell, said lower wall comprising a lower concave left end portion, a lower concave right end portion and a lower central portion located between said lower concave left end portion and said lower concave right end portion, said upper wall comprising an upper convex left end portion, an upper convex right end portion and an upper central portion located between said upper convex left and said upper convex right end portion, wherein said lower concave left end portion and said upper convex left end portion are connected to form a left junction along the left side of said cell and said lower concave right end portion and said upper convex right end portion are connected to form a right junction along the right side of said cell, said honeycomb structure having a non-coated honeycomb density; and B) covering said honeycomb walls with a high temperature coating resin to form said flexible composite honeycomb, said coating resin being present in a resin coating amount that is equal to from 10 to 25 weight percent of the total weight of said composite honeycomb, said composite honeycomb having a density of from 3 to 6 pounds per cubic foot (48 to 96 kilograms per cubic meter) wherein the ratios between the first and second fibrous support weights and said resin coating amount is from 15:1 to 5:1 and wherein the width shear strength is at least 60 percent of said length shear strength.

11. The method for making a composite honeycomb according to claim 10 wherein said high temperature coating resin is present in an amount that is equal to from 18 to 22 weight percent of the total weight of said composite honeycomb.

12. The method for making a composite honeycomb according to claim 10 wherein said composite honeycomb has a density of from 4 to 5 pounds per cubic foot (64 to 80 kilograms per cubic meter).

13. The method for making a composite honeycomb according to claim 12 wherein the width shear strength is at least 65 percent of said length shear strength.

14. The method for making a composite honeycomb according to claim 10 wherein said first fibrous support and said second fibrous support each comprises glass fabric wherein said first and second fibrous support weights are from 140 to 160 grams per square meter.

15. The method for making a composite honeycomb according to claim 14 wherein said first fibrous support and said second fibrous support each comprises glass fabric wherein said first and second fibrous support weights are from 145 to 155 grams per square meter.

16. The method for making a composite honeycomb according to claim 10 wherein said high temperature node adhesive, said high temperature first resin matrix, said high temperature second resin matrix and said high temperature coating resin are selected from the group consisting of benzoxazines, bismaleimides, cyanate ester resins, high temperature epoxy resins, polyimides and polyamideimides.

17. The method for making a composite honeycomb according to claim 14 wherein said high temperature node adhesive, said high temperature first resin matrix, said high temperature second resin matrix and said high temperature coating resin are selected from the group consisting of benzoxazines, bismaleimides, cyanate ester resins, high temperature epoxy resins, polyimides and polyamideimides.

18. The method for making a composite honeycomb according to claim 10 which includes the additional step of locating acoustic septa within one or more of said honeycomb cells.

19. The method for making a composite honeycomb according to claim 10 wherein covering said honeycomb walls with said high temperature coating resin consists of a first application step in which a first layer of high temperature coating resin is applied to said honeycomb walls and a second application step in which a second layer of high temperature coating resin is applied to said first layer of high temperature coating resin.

20. The method for making a composite honeycomb according to claim 17 wherein covering said honeycomb walls with said high temperature coating resin consists of a first application step in which a first layer of high temperature coating resin is applied to said honeycomb walls and a second application step in which a second layer of high temperature coating resin is applied to said first layer of high temperature coating resin.

\* \* \* \* \*